United States Patent
Birke et al.

(10) Patent No.: US 9,471,347 B2
(45) Date of Patent: Oct. 18, 2016

(54) OPTIMIZATION OF VIRTUAL MACHINE SIZING AND CONSOLIDATION

(71) Applicant: International Business Machines Corporation, Armonk, NY (US)

(72) Inventors: Robert Birke, Kilchberg (CH); Yiyu L. Chen, Rueschlikon (CH); Martin L. Schmatz, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 514 days.

(21) Appl. No.: 13/755,557

(22) Filed: Jan. 31, 2013

(65) Prior Publication Data

US 2014/0215460 A1 Jul. 31, 2014

(51) Int. Cl.
G06F 9/455 (2006.01)
G06F 9/50 (2006.01)
G06F 11/34 (2006.01)

(52) U.S. Cl.
CPC ........ *G06F 9/45533* (2013.01); *G06F 9/5027* (2013.01); *G06F 11/34* (2013.01); *G06F 2009/4557* (2013.01); *G06F 2209/501* (2013.01)

(58) Field of Classification Search
None
See application file for complete search history.

(56) References Cited

U.S. PATENT DOCUMENTS

| | | |
|---|---|---|
| 7,007,270 B2 | 2/2006 | Martin et al. |
| 7,925,711 B1 | 4/2011 | Gopalan et al. |
| 8,046,425 B1 | 10/2011 | Gopalan et al. |
| 2004/0010785 A1 | 1/2004 | Chauvel et al. |
| 2009/0037164 A1 | 2/2009 | Gaither et al. |
| 2010/0005173 A1* | 1/2010 | Baskaran et al. ............. 709/226 |
| 2010/0082322 A1* | 4/2010 | Cherkasova ........ G06F 11/3414 703/22 |
| 2010/0162257 A1 | 6/2010 | Hiltunen et al. |
| 2010/0281482 A1* | 11/2010 | Pike et al. .................... 718/102 |
| 2011/0191461 A1 | 8/2011 | Dasgupta et al. |
| 2012/0185851 A1 | 7/2012 | Zhang et al. |

OTHER PUBLICATIONS

Anh Vu Do, "Profiling Applications for Virtual Machine Placement in Clouds", Jul. 4, 2011, IEEE, 978-0-7695-4460-1/11.*
Isci et al., "Runtime Demand Estimation for effective dynamic resource management." Network Operations and Management Symposium (NOMS), 2010 IEEE; pp. 381-388.
Y. Koh et al.; "An Analysis of Performance Interference Effects in Virtual Environments;" In Proceedings of the 2007 IEEE International Symposium on Performance Analysis of Systems & Software, ISPASS 2007, pp. 200-209.

(Continued)

*Primary Examiner* — Lewis A Bullock, Jr.
*Assistant Examiner* — Wynuel Aquino
(74) *Attorney, Agent, or Firm* — Cantor Colburn LLP; Daniel Morris

(57) ABSTRACT

The sizing of virtual machines is optimized based on projected performance metrics. All virtual machine configuration resources are normalized by a processing device. The normalized resources for the virtual machine configurations are then stored in a catalog. An application is then profiled to obtain resource demand estimates for each virtual machine configuration and a base performance is calculated for the application. The base performance is used to predict performance estimates on all virtual machine configurations in the catalog. Accordingly, a virtual machine configuration having a lowest response time is selected.

8 Claims, 5 Drawing Sheets

(56) References Cited

OTHER PUBLICATIONS

L. Lu et al.; "Untangling Mixed Information to Calibrate Resource Utilization in Virtual Machines;" In Proceedings of the 8th ACM International Conference on Autonomic Computing, ICAC 2011, pp. 151-160.

E. Mera et al. "Towards Execution Time Estimationin Abstract Machine-Based Languages;" Proceedings of the 10th International ACM SIGPLAN Conference on Principles and Practice of Declarative Programming; ACM 2008; pp. 174-184.

E. Rosti et al; "Queueing Network Models with Two Classes of Customers;" In Proceedings of the Fifth International Symposium on Modeling, Analysis, and Simulation of Computer and Telecommunication Systems, MASCOTS 1997, pp. 229-234.

A. A. Soror et al.; "Automatic Virtual Machine Configuration for Database Workloads;" ACM Transactions on Database Systems, vol. 35, No. 1, Article 7, Feb. 2010; 47 pages.

O. Tickoo, et al. "Modeling virtual machine performance: challenges and approaches." ACM SIGMETRICS Performance Evaluation Review 37.3 (2010): pp. 55-60.

T. Wood et al.; "Black-box and Gray-box Strategies for Virtual Machine Migration;" In Proceedings of the 4th USENIX Symposium on Networked Systems Design & Implementation, NSDI 2007, pp. 229-242.

T. Wood et al.; "Profiling and Modeling Resource Usage of Virtualized Applications;" In Proceedings of the 9th ACM/IFIP/USENIX International Conference on Middleware, Middleware 2008, pp. 366-387.

* cited by examiner

OPTIMIZATION OF VIRTUAL MACHINE SIZING AND CONSOLIDATION

BACKGROUND

The present invention relates to virtual machine optimization, and more specifically, to optimizing the use of available resources through sizing and consolidating virtual machines based on projected performance metrics.

A contemporary virtual machine (VM) is a software implementation of a machine (i.e., a computer) that executes programs like a physical machine. The VM typically emulates a physical computing environment, but requests for central processing unit (CPU), memory, hard disk, network and other hardware resources are managed by a virtualization layer which translates these requests to the underlying physical hardware. VMs are created within a virtualization layer, such as a hypervisor or a virtualization platform that runs on top of a client or server operating system. The virtualization layer is typically used to create many individual, isolated VMs within a single, physical machine. Multiple VMs are typically used in server consolidation, where different services that were previously run on individual machines are instead run in isolated VMs on the same physical machine. Contemporary VMs may be moved, copied, and reassigned between host servers to improve hardware resource utilization.

Contemporary cloud computing providers allow a VM to be managed over the Internet across a number of hardware devices while only allocating as much space as needed at any one time. Typically, cloud computing providers offer a tiered pricing subscription plan for users to rent VMs on which to run their own computer applications. Users typically choose from a number of different VM configurations to meet their computing needs. For example, at each increasing price tier, the CPU cores, memory, disk space, and network bandwidth of the VM configuration are generally increased to mirror the increased resources provided. This allows a user to select and pay for a VM configuration that meets the user's target resource demands.

SUMMARY

According to an embodiment, a computer-implemented method for optimizing the use of available resources through the sizing of virtual machines is disclosed. The computer-implemented method includes normalizing, with a processing device, resources for all virtual machine configurations. The normalized resources for the virtual machine configurations are then stored in a catalogue. An application is profiled to obtain resource demand estimates for each virtual machine configuration and a base performance is calculated for the application. The base performance is used to predict performance estimates on all virtual machine configurations in the catalogue. Accordingly, a virtual machine configuration having a lowest response time is selected.

According to another embodiment, a computer system for optimizing the use of available resources through the sizing of virtual machines is disclosed. The computer system is configured to perform a method including normalizing, with a processing device, resources for all virtual machine configurations. The normalized resources for the virtual machine configurations are then stored in a catalogue. An application is profiled to obtain resource demand estimates for each virtual machine configuration and a base performance is calculated for the application. The base performance is used to predict performance estimates on all virtual machine configurations in the catalogue. Accordingly, a virtual machine configuration having a lowest response time is selected.

According to another embodiment, a computer system for optimizing the use of available resources through the consolidation of virtual machines is disclosed. The computer system is configured to perform a method including executing, with a processing device, an instance of an application in isolation. The resource demands of the application are profiled and the resource demand inputs from a profiler and user-defined performance inputs from a user interface are collected. Performance metrics for the application instance are predicted with a queuing model using a mean value analysis. A minimum required number of virtual machine configurations for a consolidation set are calculated and all the possible combinations of virtual machine configurations for the consolidation set are predicted. From the set of all possible combinations of virtual machine configurations, an optimal consolidation set according to the user-defined performance inputs is selected. Accordingly, the virtual machine configuration is moved to the optimal consolidation set.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
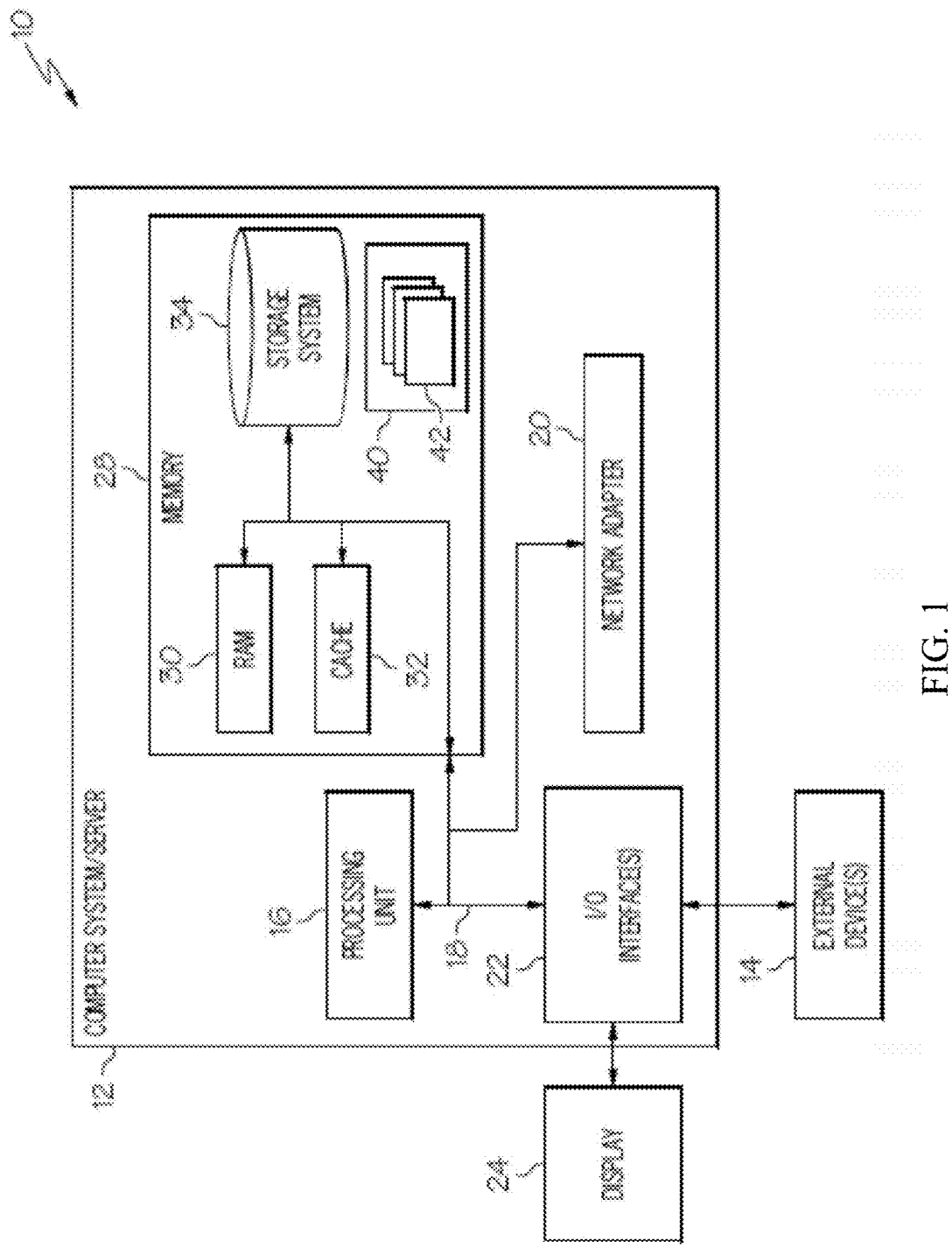
FIG. 1 depicts a cloud computing node according to an embodiment of the present invention.

Embodiments disclosed herein optimize the use of available compute resources through sizing and consolidating virtual machines based on projected performance metrics.

Embodiments provide a catalogue-based VM sizing engine that selects an optimized VM configuration size that meets a particular user's application performance targets. The catalogue-based VM sizing engine normalizes and stores compute resources for all VM configuration sizes in the catalogue. A given application is then profiled to obtain demand estimates for a VM configuration size. A base performance response time is obtained for the given application and then the performance is projected on all possible VM configuration sizes in the VM catalogue. A VM sizer compares the performance response times and selects the VM configuration size which has lowest response time.

Embodiments also provide a user-centric VM consolidator that consolidates workloads on a same physical machine in order to maximize resource utilization without violating user-specified performance objectives. A profiler aggregates demand metrics based on executing a single VM in isolation. A VM consolidator collects the demand inputs from the profiler along with user-defined performance priorities and invokes a performance predictor to obtain projected performance metrics for all possible combinations of VM types. The VM consolidator then identifies feasible VM consolidation sets and selects an optimal set according to the user-defined performance priorities. The VM workload is moved to the optimal set according to an embodiment.

Contemporary data center administrators can create a large number of virtual VMs for different workload requests. Each VM is provisioned with an amount of computing resources commensurate with workload requirements. The administrators can then consolidate all the VMs into a smaller number of physical servers, with the goal of minimizing the total number of physical servers required. Administrators of large data centers and cloud computing platforms often struggle to consolidate workloads on the same physical machine in order to maximize resource utilization without violating user-defined performance priorities. This issue is challenging because performance interference between consolidated workloads may significantly affect their execution time. Embodiments disclosed herein reduce costs by providing precise predictions of VM workload execution times to consolidate VMs such that user specified performance metrics are achieved and system performance metrics are maintained.

Additionally, when a user migrates an application to a contemporary cloud computing provider, the calculation of cost for a VM configuration size to host the application may be daunting due to the difficulty in calculating how much of each resource will be required by the user's application. Published performance statistics and trial and error may generally provide an estimate of resource usage, but when it comes to calculating resource usage and VM configuration size, many users will find be uncertain of which size of VM configuration to deploy based on resource requirements. Embodiments disclosed herein provide a catalogue-based VM sizing engine that selects an optimized VM configuration size that meets a particular user's application performance targets.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of a cloud computing node for collectively aggregating digital recordings of an event of an embodiment is shown. Cloud computing node 10 is only one example of a suitable cloud computing node and is not intended to suggest any limitation as to the scope or use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
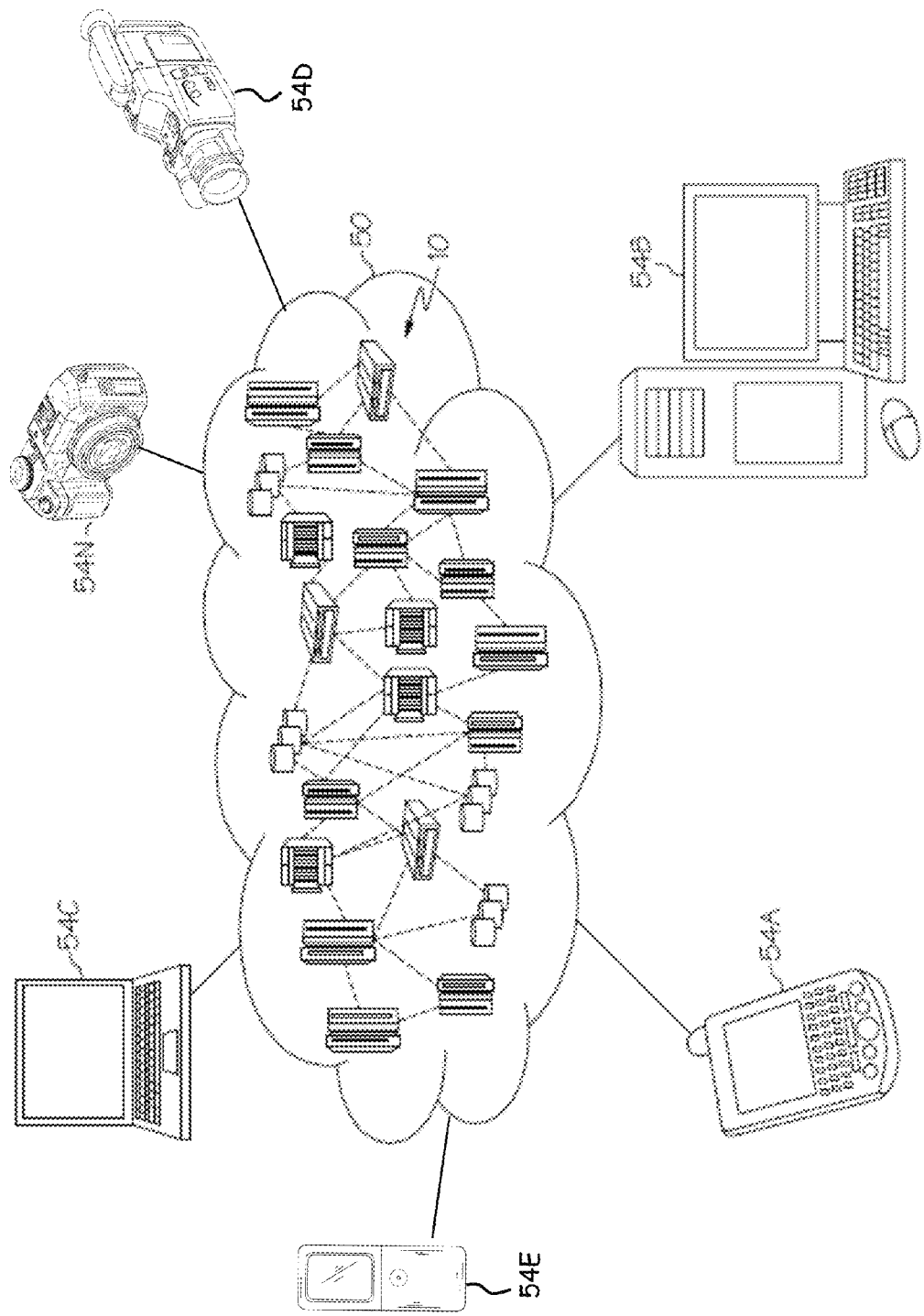
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
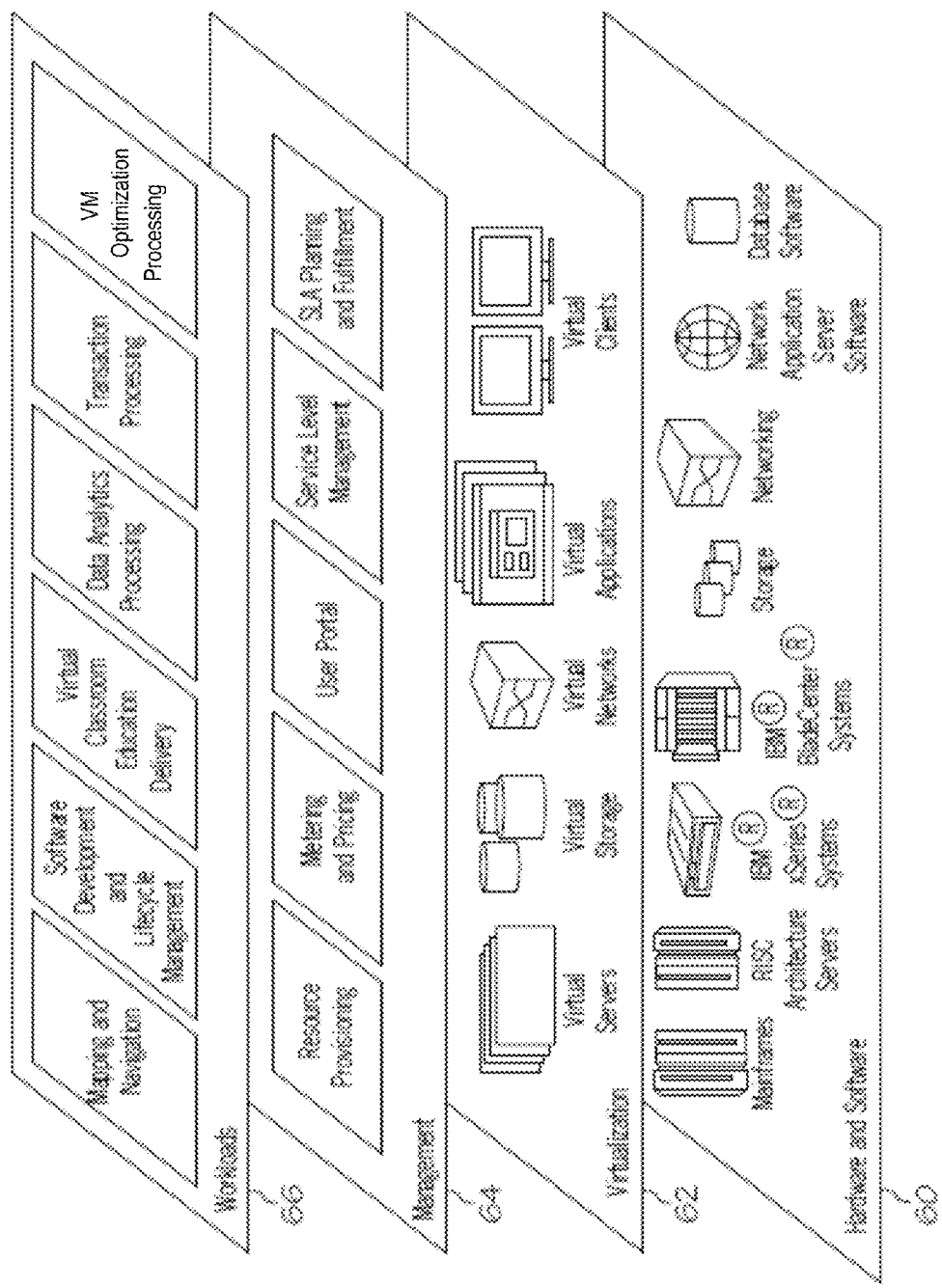
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual machine (VM) optimization processing.

Figure 4:
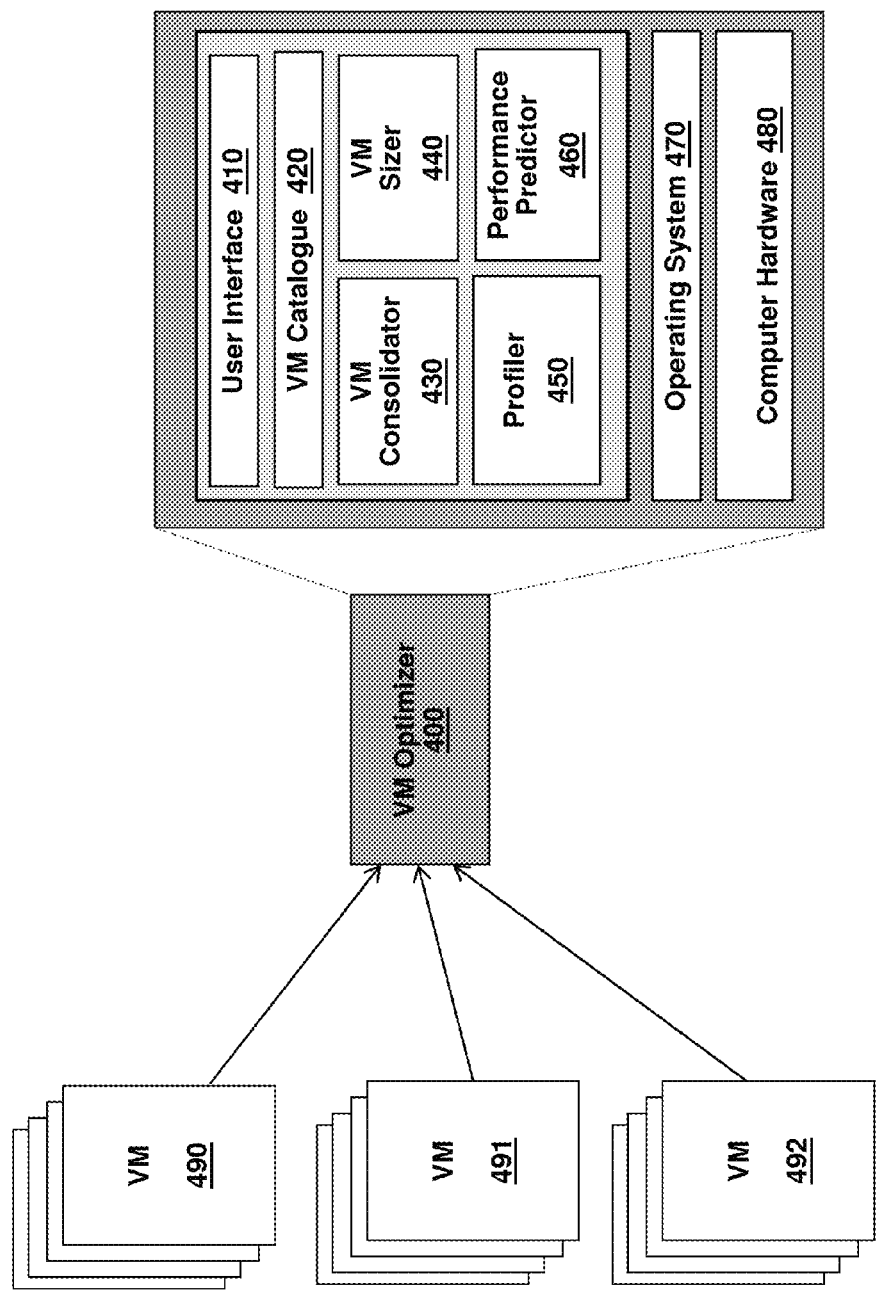
FIG. 4 depicts a flow diagram a VM optimizer for providing optimized use of available compute resources through sizing and consolidating of VMs based on projected performance metrics according to an embodiment.

With reference now to FIG. 4, an embodiment of a VM optimizer 400 for providing optimized use of available compute resources through sizing and consolidating of VMs based on projected performance metrics is shown. According to an embodiment, the VM optimizer 400 may be implemented as a dedicated hardware, an accelerator, or a VM module. The VM optimizer 400 includes a user interface 410, a VM catalogue 420, a VM consolidator 430, a VM sizer 440, a profiler 450, a performance predictor 460, an operating system 470, and computer hardware 480.

The user interface of an embodiment provides an interface for users to characterize user-defined performance priorities and to select VM configuration sizes and VM consolidations that optimize compute resources according to the user-defined performance priorities. According to an embodiment, users may visualize all the collected values, derived metrics, and projected execution times as detailed charts, figures, and tables on the user interface.

The VM catalogue 420 of an embodiment stores resource and performance metrics for all possible VM configuration types 490, 491, 492. The VM consolidator 430 of an embodiment consolidates VMs on a same physical machine in order to maximize resource utilization without violating user-specified performance objectives. The VM sizer 440 of an embodiment selects an optimized VM configuration size from the VM catalogue 420 that meets a particular user's application performance targets. The profiler 450 of an embodiment aggregates demand metric estimates based on execution of an application in a VM configuration.

The performance predictor 460 of an embodiment predicts and projects performance metrics for an application running on each VM configuration type. According to an embodiment, the performance predictor 460 may execute an application on a closed, three-station queuing network model which is parameterized by a profiling of the application's CPU, disk and network demands. The performance metrics are calculated using a mean value analysis (MVA) algorithm known to those of skill in the art. The operating system 470 of the VM optimizer 400 acts as an intermediary between the VM optimizer programs and the computer hardware 480 according to an embodiment.

Figures 5A, 5B:
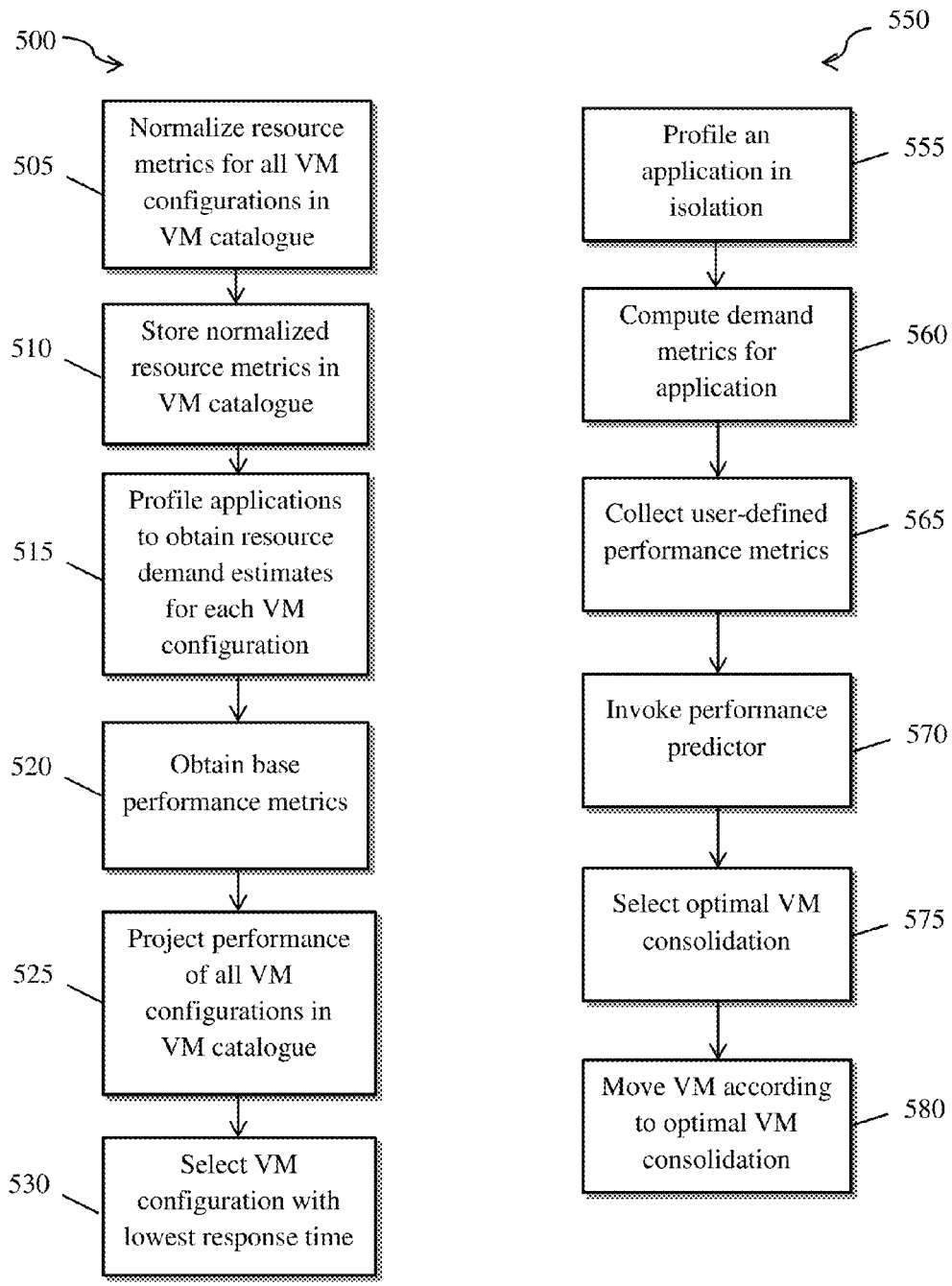
FIG. 5A depicts a VM sizing operation for selecting an optimized VM configuration size that meets a user's performance targets according to an embodiment.
FIG. 5B depicts a user-centric VM consolidation operation for consolidating workloads on a same physical machine to maximize resource utilization without violating user-specified performance objectives according to an embodiment.

In FIG. 5A, a VM sizing operation 500 for selecting an optimized VM configuration size that meets a user's performance targets is shown. When a user sends an execution request to a public or private cloud, the request is forwarded to the profiler 450 of the VM optimizer 400. According to an embodiment, a base profiler server is divided into a small partition and a big partition, each having CPU speed, memory size, storage I/O speed, and network speed resources, for performing a profiling of a given application.

In block 505, resource metrics for all available VM configuration sizes are normalized with respect to the base profiler server. That is, $R^j=[r_1^j, r_2^j, r_3^j, r_4^j]$ is computed for all j, wherein R is a resource metric measurement, j is a VM configuration size, $r_1$ is CPU speed, $r_2$ is memory size, $r_3$ is storage I/O speed, and $r_4$ is network speed. According to an embodiment, a resource specification is computed on the small partition s, $R^s=[r_1^s, r_2^s, r_3^s, r_4^s]$, such that the computed resource metrics for all VM configuration sizes may be normalized with respect to the profiler server.

In block 510, the VM catalogue 420 of an embodiment is populated to store all the VM configuration sizes whose CPU, memory, disk, and network resources are normalized with respect to the base profiler server. According to an embodiment, applications are then profiled to obtain resource demand estimates for each VM configuration size, as shown in block 515. When a user sends an execution request to the public or private cloud, the request is immediately forwarded to the profiler server and executed on both partitions to obtain a demand-resource (D-R) function, $D_i=a_i+b_iR_i$, wherein D is a demand metric measurement. Demand $D_i$ is defined as the execution time on each resource $R_i$, using two settings on the resources, for I=1, 3, 4, wherein $D_1$ is CPU busy time, $D_3$ is disk busy time, $D_4$ is network busy time. A memory demand, $D_2$, is defined by a passive measurement (i.e., a memory footprint size), $D_2=a_2+b_2R_2$. Applications are executed on both partitions of the profiler server for a given application, that is, D is computed using R for all j, to obtain demand estimates for each VM configuration size.

The D-R function is a linear function with two unknown coefficients, $b_i$, which are obtained from the resource execution times (i.e., busy times) and resources, based on two partitions. Essentially, for four resources $r_1$, $r_2$, $r_3$, $r_4$, there are four corresponding D-R functions. According to an embodiment, the D-R function is used to estimate the resource demands for each VM configuration size and further performance metrics. To get estimated resource demands for all VM configuration sizes stored in the VM catalogue 420, the normalized resource measurements are plugged into the D-R function using two executions according to an embodiment. The obtained D-R coefficients, $a_i$, $b_i$, may be stored in memory as [($a_1$, $b_1$) ($a_2$, $b_2$) ($a_3$, $b_3$) ($a_4$, $b_4$))] for each resource type.

In block 520, a base performance metric is obtained by the performance predictor 460 of an embodiment for a given application. To get the estimated performance metrics (i.e., response time), an embodiment uses a queuing network model consisting of a CPU, a memory, a disk, and a network. According to an embodiment, the estimated resource demands are applied to all VM configuration sizes using an MVA algorithm. More specifically, if $D_2<R_2$, the MVA algorithm is run with demand metric measurement D to obtain response times for all VM configuration sizes j. If $D_2>R_2$, this VM configuration is not valid according to an embodiment.

In block 525, predicted response times are projected on all possible VM configuration sizes in the VM catalogue 420 by the performance predictor 460 according to an embodiment. That is, the estimated resource demands are applied for all VM configuration sizes. A VM sizer 440 of an embodiment then compares the response times and recommends the optimal VM configuration size j that satisfies a user's performance targets, as shown in block 530. In other words, the VM sizer 440 may select a VM configuration size which has the lowest response time.

In FIG. 5B, a user-centric VM consolidation operation 550 for consolidating workloads on a same physical machine to maximize resource utilization without violating user-specified performance objectives is shown.

In block 555, the profiler 450 aggregates demand metrics based on executing a single VM in isolation according to an embodiment. The CPU system utilization when executing one instance, Ucs1, and the average CPU utilization when executing one instance, Uc1, are collected using a known program such as vmstat. The average disk operations per second, $\lambda$d, the average service time, s, the average queue size, q, the total number of disk operations per second, Oqd, and the disk queued operations per second, Otd, are collected using a known program such as iostat. The average transmission rate per link, R, and the average rate of the network sending and receiving bytes per second, $\lambda$N, are collected using a known program such as netstat.

In block 560, the profiler 450 computes the CPU demand, the disk demand, and the network demand for the execution n VMs according to an embodiment. The average CPU demand of n VMs, Dc, is computed by applying Dc=T·Ucs1·min{n, $\xi$}/n, wherein T is the time to complete one iteration and $\xi$ is the saturation point 1/Uc1. The average disk demand of n VMs, Dd, is computed by applying Dd1=$\lambda$d·s/(q) and Dd={Dd1/n^(Oqd/Otd)}/n. The average network demand, DN, is computed by applying DN=$\lambda$N·T·min{$\lambda$N,Rn}.

In block 565, an embodiment collects the demand inputs from the profiler 450 along with user-defined performance priorities. According to an embodiment, the performance predictor 460 is invoked to obtain projected performance metrics for all possible combinations of VM configuration types, as shown in block 570. In block 575, the VM consolidator 430 then identifies all feasible VM consolidation sets and selects an optimal set according to the user-defined performance priorities according to an embodiment. In block 580, the VM workload is moved to an optimal VM set taking the user-defined performance priorities into account according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method, comprising:
receiving a request to migrate an application, wherein the request comprises an application performance objectives associated with the application;
normalizing, with a processing device, resources metrics (R) for a plurality of virtual machine configurations sizes with respect to profiled metrics, wherein each virtual machine configuration size is normalized as $R^j=R^j=[r_1^j, r_2^j, r_3^j, r_4^j]$, j is a virtual machine configuration size, $r_1^j$ is central processing unit speed, $r_2^j$ is memory size, $r_3^j$ is input/output speed, and $r_4^j$ is network speed and the profiled metrics are observed values of $r_1$, $r_2$, $r_3$, and $r_4$;
storing the normalized resource metrics associated with each of the virtual machine configuration sizes in a catalogue;
calculating and storing a demand metric measurement (D) for each resource of the virtual machine configuration size of a plurality of virtual machine configuration sizes to obtain resource demand estimates for each of the resources of a respective virtual machine configuration size; wherein the calculating comprises:

profiling the application for each of the virtual machine configuration size:
  executing the application on a first partition of a memory and a second partition of a memory;
  calculating the demand metric measurement (D) for an execution time of each of the resources associated with a respective virtual machine configuration size by using a demand metric measurement ($D_i=a_i+b_iR_i$) for each of the resources (R); the each $D_i$ is a demand metric calculation for a respective resource ($R_i$) of a configuration under an execution time, the $a_i$ corresponds to the first partition and the $b_i$ corresponds to the second partition;
  and storing the $a_i$ and the $b_i$ coefficients of the demand resource function for each of the respective resources (R) for each virtual machine configuration size;
calculating a base performance for the application;
predicting performance estimates on each of the virtual machine configuration size in the catalogue by applying the demand metric measurements (D) of the resources associated with each of the respective virtual machine configuration size;
selecting, based on the predicting, a virtual machine configuration size in the catalogue having a lowest response time that meets the application performance objectives;
invoking the selected virtual machine configuration size; and
migrating the application to the selected virtual machine configuration size.

2. The computer-implemented method of claim 1, wherein the resources for a virtual machine configuration include central processing unit resources, memory resources, disk resources, and network resources.

3. The computer-implemented method of claim 1, further comprising a base profiler server, the base profiler server being partitioned into a small partition and a big partition, each having central processing unit resources, memory resources, disk resources, and network resources.

4. The computer-implemented method of claim 3, wherein all virtual machine configurations are normalized with respect to a resource specification on the small partition.

5. The computer-implemented method of claim 3, wherein the application is executed on both the small partition and the big partition of the base profiler server for each virtual machine configuration to obtain a demand-resource function.

6. The computer-implemented method of claim 5, wherein the normalized resources for each virtual machine configuration are plugged into the demand-resource function to obtain the resource demand estimates for each virtual machine configuration.

7. The computer-implemented method of claim 1, wherein the predicting of performance estimates further comprises running a mean value analysis to obtain a response time for all virtual machine configurations in response to a memory demand being less than a resource demand.

8. The computer-implemented method of claim 1, wherein the predicting of performance estimates further comprises running a mean value analysis with a partitioned memory demand to obtain a response time for all virtual machine configurations in response to a memory demand being more than a resource demand.

* * * * *